April 7, 1942. P. H. GENTZEL 2,278,437
SAFETY VALVE CONSTRUCTION
Filed July 31, 1939    5 Sheets—Sheet 1
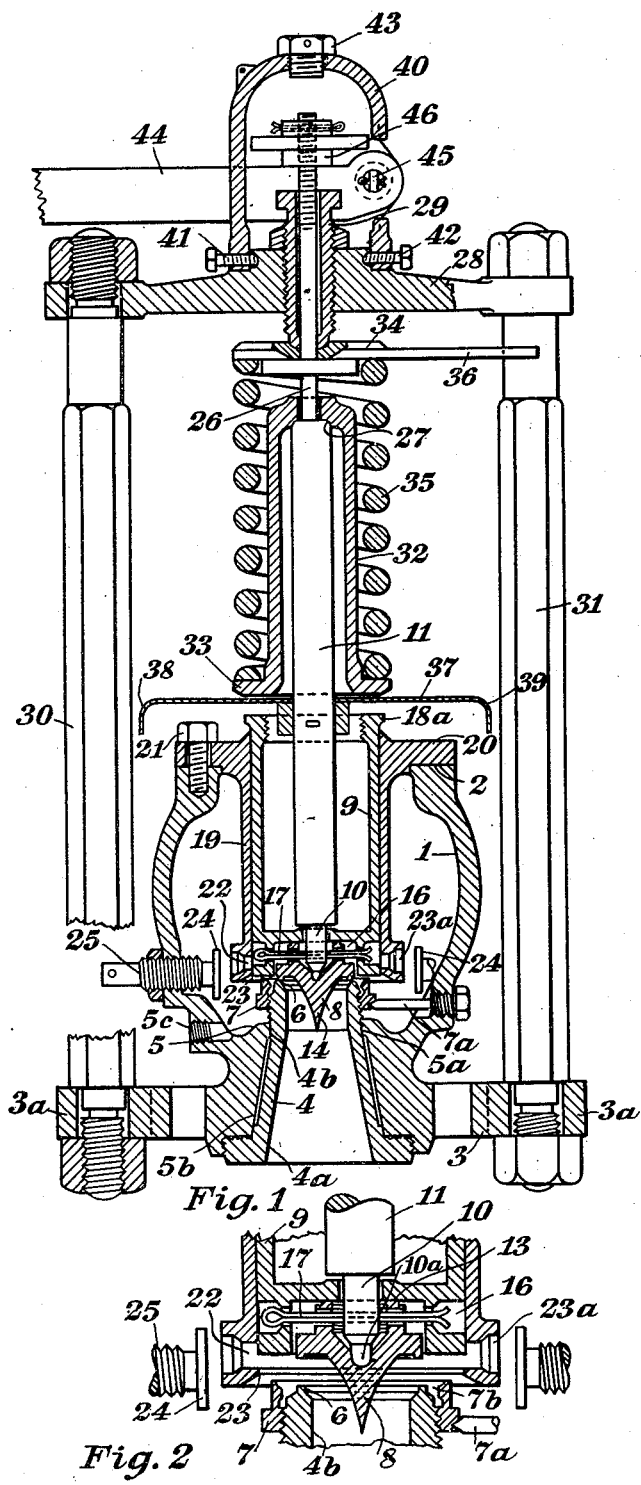
INVENTOR
Perry H. Gentzel
BY
Cassar and Rivise
ATTORNEYS April 7, 1942.   P. H. GENTZEL   2,278,437
SAFETY VALVE CONSTRUCTION
Filed July 31, 1939   5 Sheets-Sheet 2
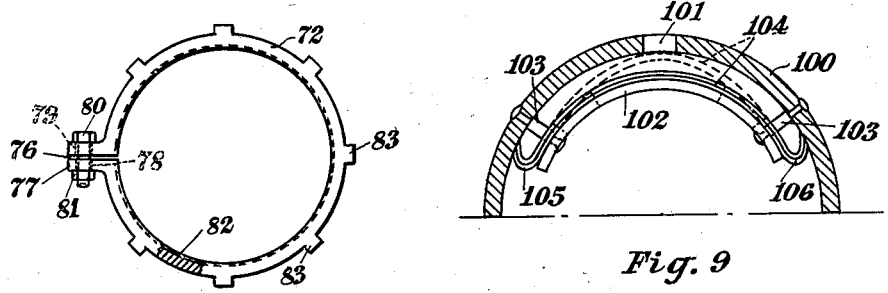
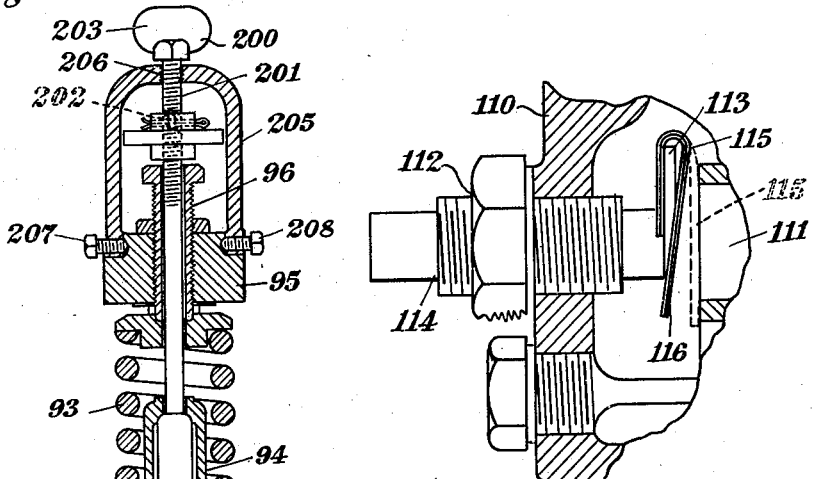
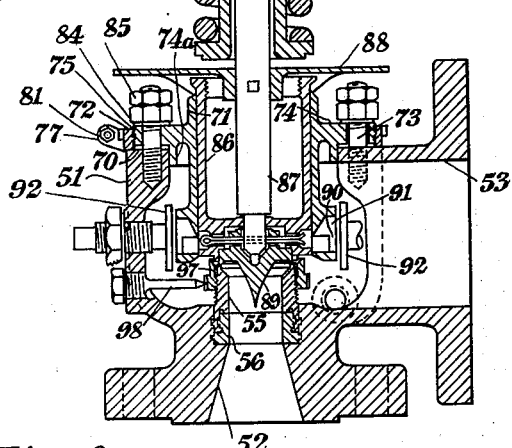
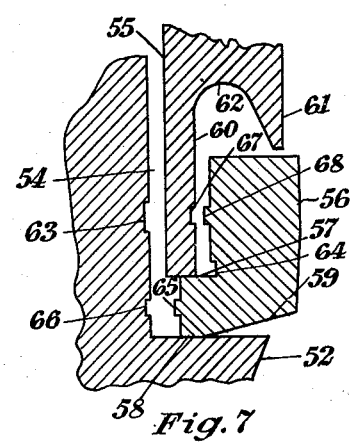
INVENTOR.
Perry H. Gentzel
BY
Caesar and Rivise
ATTORNEYS April 7, 1942.　　P. H. GENTZEL　　2,278,437
SAFETY VALVE CONSTRUCTION
Filed July 31, 1939　　5 Sheets-Sheet 4
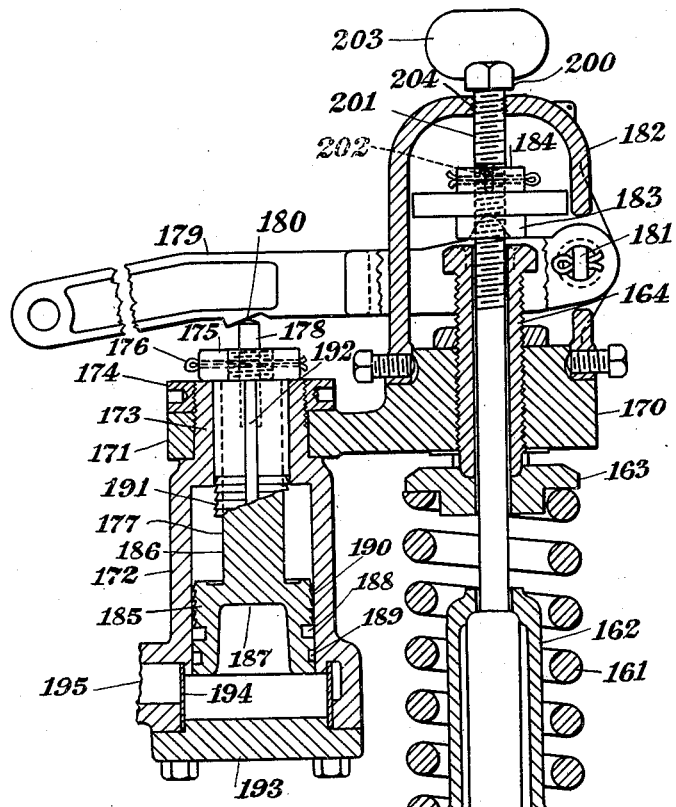
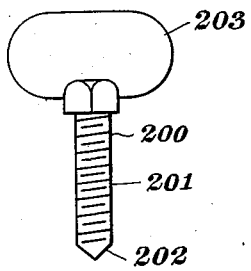
Fig. 13
Fig. 12
INVENTOR
Perry H. Gentzel
BY
Caesar and Rivise
ATTORNEYS

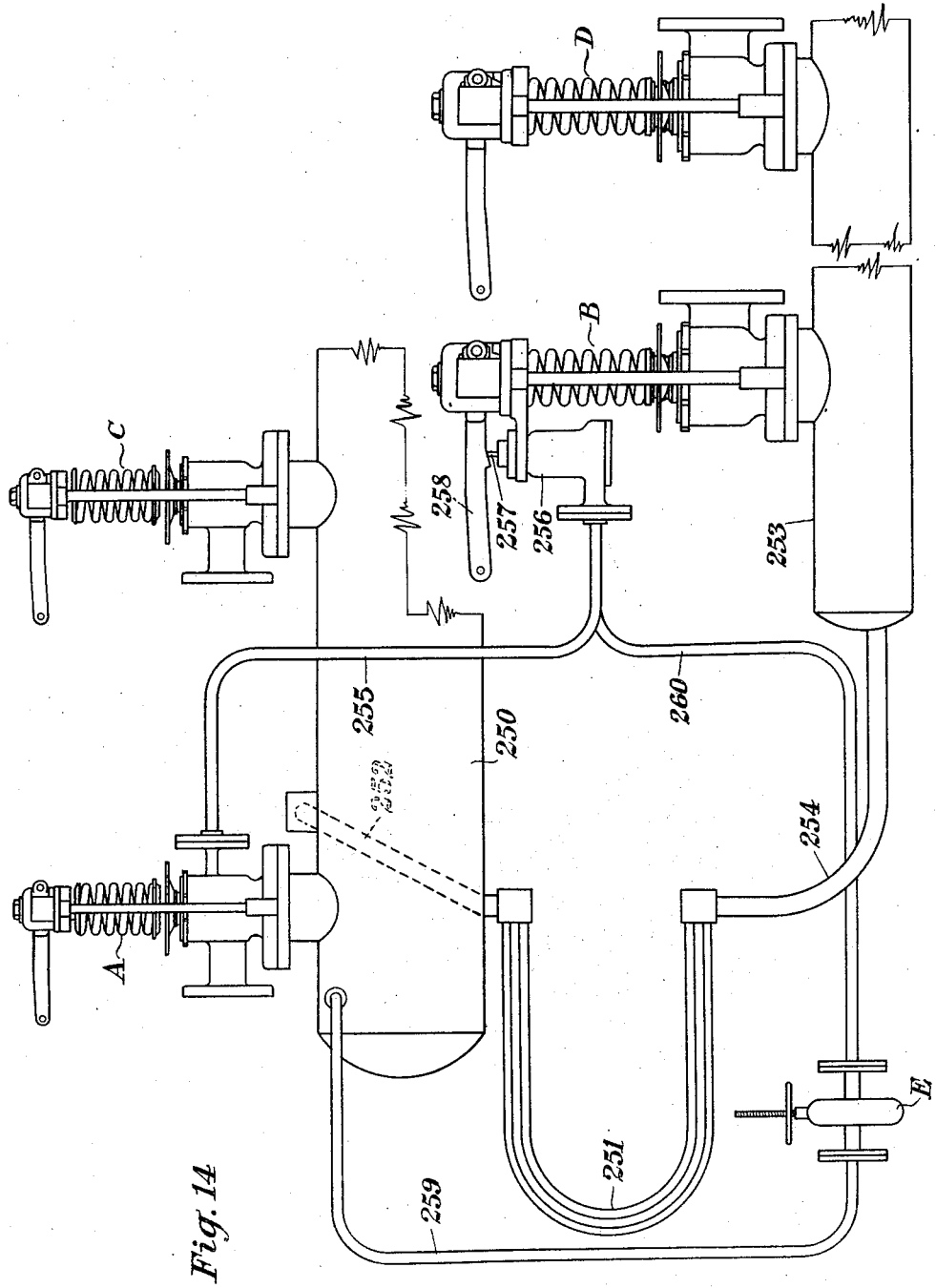

Patented Apr. 7, 1942

2,278,437

UNITED STATES PATENT OFFICE 2,278,437

SAFETY VALVE CONSTRUCTION

Perry H. Gentzel, State College, Pa.

Application July 31, 1939, Serial No. 287,608

17 Claims. (Cl. 137—53)

The present invention relates to safety valve constructions, and has particular reference to that type of safety valve generally referred to in the art as a "pop" or "pop safety" valve.

Pop safety valves are widely used upon steam boilers, oil stills, compressed air tanks, superheaters and other tanks containing fluid or gas under pressure in order to relieve excess pressure.

Pop safety valves generally consist of the following essential elements:

1. A throat tube, which may be any relief opening from the tank containing fluid or gas under pressure, and which is provided about its upper periphery with an annular valve seat;

2. A valve disk normally resting upon the valve seat and closing the throat tube;

3. A stem or spindle carrying the valve disk;

4. A spring, which is coiled about the stem or spindle and which urges the valve disk to its seat against the pressure of the fluid or gas in the throat tube; and 5. A valve body encasing the operative parts of the valve.

A pop valve operates in the following general manner: When the pressure of the fluid or gas in the throat tube exceeds the force of the spring against the valve disk, the disk is caused to recede from its seat thus affording a relief opening for the excess pressure. As soon as the pressure has dropped sufficiently below the "popping" pressure, the disk returns to its seat. The distance the valve disk rises from its seat is termed its "lift." The drop in pressure which is necessary to cause the disk to return to its seat is generally referred to as the "blow-down."

There are two important problems in designing an efficient pop safety valve that will meet the strict requirements of the engineering profession. One is to secure full or maximum lift in the shortest space of time, so that relief may be obtained almost instantaneously. The other is to reduce blow-down to a minimum so that the valve will close abruptly and sharply almost as soon as relief has been obtained.

The difficulty of securing full lift of the valve disk quickly is due to the fact that as the disk recedes from its seat the resistance of the loading spring gradually increases. Prior workers in the art have sought to overcome this difficulty by increasing the pressure of the fluid or gas on the underside of the disk gradually or in a series of stages as the disk receded from its seat. To this end conventional valves are generally provided with various expedients such as deflecting sleeves and "huddling chambers" to cause the pressure of the fluid or gas to be built up under the disk. In valves provided with these expedients maximum lift, if it is secured at all, is secured gradually or in a series of steps or stages. Hence, relief is not secured instantaneously. Furthermore, due to the fact that an accumulation or overpressure of from 3 to 6% is necessary to secure maximum lift, the jet action and the reactive force under the disk become enormous and render it exceedingly difficult to close the valve when the necessary relief has been obtained. Hence, blow-down is rendered excessive. If it is attempted to control or adjust the jet action and reactive force of the conventional valve, the lift is reduced to such an extent as to render the valve unacceptable to the trade. Prior to the present invention, it has been considered practically impossible to design a pop valve of relatively simple construction having maximum lift and minimum blow-down.

Another difficulty with prior art valves is that they do not always pop at the same pressure. Changes in popping pressure can generally be attributed to the phenomenon known as "crawl." "Crawl" is simply extension or elongation of the body of the valve caused by the high temperatures to which valves are generally subjected. Measurements on small and medium sized valves of conventional construction indicate that the "crawl" amounts to about .020 to .050" with greater elongation in larger valves. The result is equivalent to turning back or loosening the pressure screw or releasing the pressure on the spring to the extent of from 14 to 70 pounds. Hence, conventionally constructed valves often pop 14 to 70 pounds lower on the second and third pops than on the first.

Still another difficulty with the conventional prior art valve is the fact that there are four distinct cycles of abuse between the valve seat and the disk. First, the throat tube being subjected to direct contact with the steam expands suddenly and the valve seat drags against the undersurface of the valve disk. Then the valve disk expands and drags over the valve seat. Then when the boiler or steam line is cooled down, the throat tube cools first dragging the valve seat once more against the disk, and finally the disk follows and drags over the valve seat. These four cycles occur in a conventional safety valve, even though the valve never pops, thus causing leakage between the disk and its seat.

A primary object of the invention is to provide a distinctively new valve construction particularly adapted for service as a safety valve for pressures as high as 3000 pounds per square inch and temperatures as high as 1000° F.

Another object of importance is to provide a valve in which the valve disk rises instantaneously in a single stage to its maximum lift without accumulation of pressure or overpressure, and closes abruptly and positively at a relatively small drop in pressure below that at which the valve is set to pop.

Another important object is to provide a valve which operates smoothly, sharply and positively and without dirling, flutter, simmering (warn), chatter or seat drumming, and which closes without rebound or leak.

Another object of importance is to provide a safety valve having a practically constant "popping pressure."

Another important object is to provide a safety valve having provision for regulating "blow down."

Another object of importance is to provide a safety valve in which the tearing action between the valve seat and the valve disk is reduced to a minimum or eliminated entirely.

Another important object is to provide a safety valve in which leakage between the seat ring and the body wall resulting from variable expansion and contraction is practically eliminated.

Another object is to provide a safety valve having provision for protecting the throat tube and the valve body from entrapped moisture and for preventing the collection of particles of iron and other foreign materials, which in prior valve constructions have a tendency to adhere to the surface of the throat tube and to set up local centers for electrolytic action. Safety valves of conventional construction often have to be junked prematurely because the valve body and the throat tube are practically destroyed by corrosion.

Another object is to provide a safety valve which is capable of being used as a pilot valve in a fluid pressure system.

Another object is to provide a safety valve which is capable of being used as a pilot-actuated valve in a fluid pressure system.

Another object is to provide a safety valve which, while capable of accomplishing all of the foregoing objects, is nevertheless of relatively simple and inexpensive construction and can be assembled and dismantled very readily.

Other objects and advantages will appear as the description of the invention proceeds.

Referring briefly to the drawings,

Figure 1 is a vertical section, partly in elevation and partly broken away, of an illustrative embodiment of the safety valve of the invention;

Figure 2 is a fragmentary section of the valve disk and adjacent parts of the valve shown in Figure 1, the elements being shown in the relative positions they occupy when the valve is in substantially full open position and ready to cut off and close;

Figure 3 is a vertical section through the valve disk itself;

Figure 4 is an enlarged fragmentary section through the valve disk carrier and guide to illustrate the serrated outer periphery of the valve disk carrier;

Figure 5 is a fragmentary section similar to Figure 2 of a modified form of safety valve, the guide for the valve disk carrier being omitted for greater clearness of illustration and the valve disk being shown on its seat;

Figure 6 is a vertical section through another illustrative embodiment of the safety valve of the invention, the section being taken at right angles to that of Figure 1, and the bonnet and operating lever being replaced by a novel form of gag for testing the valve;

Figure 7 is an enlarged fragmentary vertical cross-section showing the manner in which the throat tube is assembled and secured to the body of the valve;

Figure 8 is a plan view, partly broken away, of the adjusting ring for the guide;

Figure 9 is a fragmentary horizontal cross-sectional view through the exhaust belt of a modified form of the valve illustrated in Figure 6, the modified form of valve being provided with bi-metallic strips for controlling the exhaust ports in the exhaust belt;

Figure 10 is an enlarged fragmentary vertical section through the exhaust belt and one of the metering valves of the same modified form of safety valve;

Figure 12 is a vertical section, partly in elevation, of a pilot-actuated valve made according to the present invention, the section being taken at right angles to that of Figure 11;

Figure 13 is an elevation of the novel form of gag for use when testing the valve; and Figure 14 is a diagrammatic or schematic representation of a novel fluid pressure system embodying safety valves of the present invention.

Figure 11:
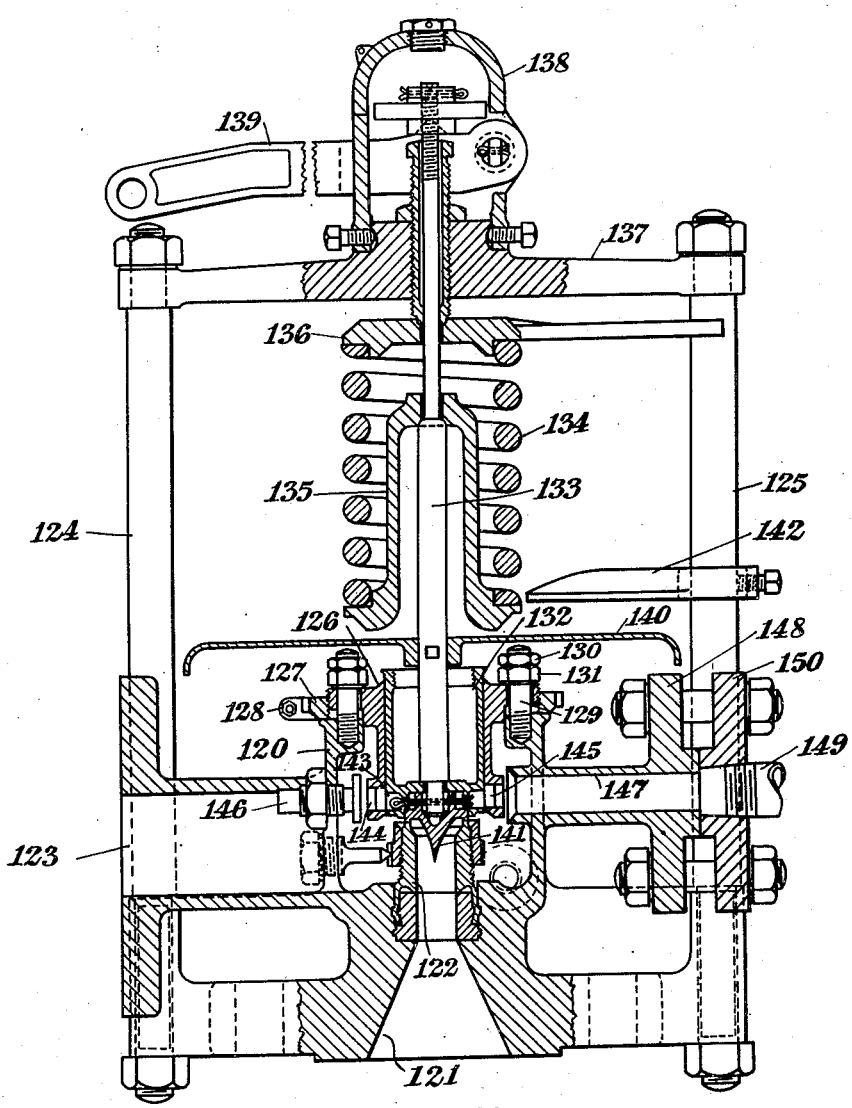
Figure 11 is a vertical section, partly in elevation, of a pilot valve made in accordance with the teachings of the invention.

Referring in greater detail to the embodiment of the invention illustrated in Figures 1 to 5 inclusive, the numeral 1 denotes the valve body or bowl of the valve. This element, which is shown as being in the form of a pear-shaped hollow casting or forging, may advantageously be of steel, though other metals or alloys may be used. The top of the body is open and is provided with a flat annular seat 2, which serves a purpose to be hereinafter pointed out.

The body is provided at its lower end with the horizontal flange 3 and the lugs 3a. The numeral 4 denotes a throat tube, which may be any relief opening from a steam boiler or a tank containing fluid under pressure. The tube is illustrated as having a relatively wide lower end 4a and a restricted upper end 4b, and extends well into the interior of the body. The restricted upper end 4b is preferably stream-lined to cooperate with the lower surface of the valve disk to be hereinafter described to reduce to a minimum the resistance to the flow of the steam or other fluid through the throat tube. The throat tube may advantageously be made of austenitic steel, and is preferably so designed and secured to the body that the tube and the valve body will fit snugly at working temperatures. In this way it has been found possible to avoid undue stresses at the base of the valve and to reduce to a minimum the compressive strain on the tube.

As illustrated, the body of the valve is preferably provided with a raised floor 5 fitting closely about the throat tube near its restricted upper end 4b as at 5a to protect the throat tube and the body of the valve from entrapped moisture. Entrapped moisture generally contains acids and corrosive materials which are detrimental to the material of the throat tube and the valve body, particularly in the area denoted by 5b. The raised floor may be provided with a central cavity in which the moisture can be collected and from which it can be drained through a suitable opening 5c. This construction also prevents the collection of particles of iron and other foreign materials, which may otherwise adhere to the surface of the throat tube and set up local centers for electrolytic action.

The throat tube 4 is provided at its upper end with an annular valve seat 6. It may also be provided with a nozzle ring 7 mounted concentrically with the valve seat. The ring 7 is preferably mounted adjustably on the upper end of the throat tube as by means of cooperating screw threads on both the tube and the ring. The locking screw 7a may be provided to maintain the ring in adjusted position. The shape of the ring 7 is preferably such as to secure a minimum "blow-down" and to eliminate what is technically known as "warn" at popping.

It is to be particularly noted that between the valve seat 6 and the upper periphery of the nozzle ring 7 there is formed a V-shaped annular groove 7b. This groove constitutes in effect a pilot valve, the least amount of steam leaking into this space from the throat tube being sufficient to cause the valve to pop without any accumulation of pressure.

The valve disk (see Figure 3) is designated generally by the numeral 8. It is detachably connected to the disk carrier or piston 9 and to the lower reduced end 10 of the spindle 11 in a manner to be described. It is to be particularly noted that the piston 9 preferably projects through the valve body to the atmosphere. In this way, I have found it possible to obviate the accumulation of steam above the valve disk which usually occurs in conventional constructions. The valve disk consists of a disk-like body portion 12, which is wide enough to cover the valve seat 6 and to close the passage through the bowl. The underside of the body portion 12 is preferably provided with an annular rim 12a, which may advantageously be the same width as the valve seat 6. This rim serves to prevent the formation of fins on the valve seat. The formation of fins is a principal cause of leakage.

By providing the valve disk with the lower conical portion 14 and by providing the throat tube with the restricted upper end 4b as previously noted, I have in effect stream-lined the portions of the valve with which the steam comes into direct contact. By so doing, I have increased the nozzle efficiency of the throat tube to the maximum obtainable (94 to 97%). In this manner, I have found it possible to obtain full opening of the valve instantaneously and without any appreciable accumulation of pressure (overpressure).

The valve disk is further provided with a central recess 15 which extends well into the body portion, the lower end 15a of the recess being hemi-spherical in shape and extending well below the seat level 12a. The body of the disk is symmetrical in design and preferably has the same wall thickness as the throat tube. The valve disk has a minimum amount of metallic contact with the disk carrier 9 and the spindle 11. It is to be particularly noted that the reduced end 10 of the spindle has a narrow rounded point 10a which is received in the hemi-spherical recess in the valve disk 8. The foregoing structure is such that the heat transfer between the various elements is kept at a minimum and the radial expansion of the valve disk is substantially the same as that of the valve seat 6. As a result, the tearing action between the valve disk and the seat so characteristic of prior art valves is practically eliminated. Furthermore, there is no tendency for the valve disk to either tilt on its seat or to become distorted. Hence, the valve disk must either pop or lie substantially flat on its seat.

The disk carrier or piston 9 is in the form of a cylindrical cup having the cylindrical recess 16 in its bottom. The valve disk 8 is received within the recess 16 with its conical lower portion 14 extending down into the restricted upper end of the throat tube 4. The depth of the recess is preferably such that the body 8 projects slightly below the bottom of the disk carrier. The restricted lower end 10 of the spindle 11 extends through an aperture in the bottom of the carrier 9 into the recess 15 in the valve disk. A cotter pin 17, which may well be of stainless steel, extends through alined apertures in the disk carrier 9, the restricted upper portion 13 of the valve disk and the restricted lower end of the spindle 11 to detachably secure the valve disk to the disk carrier and to the spindle. The rounded pointed lower end of the spindle fits snugly in the conical or hemi-spherical bottom of the recess 15 of the valve disk.

The disk carrier or piston 9 is slidably mounted in the guide 19. The guide is substantially cylindrical in form and is provided at its upper end with an annular flange 20 which is adapted to seat on the annular seat 2 on the bowl 1. The flange 20 may be secured to the seat in any suitable manner as by means of the threaded bolt 21. In case the valve seat has to be remachined, the guide member may be lowered the necessary amount to cause a reseating of the valve disk by machining the annular seat 2 the required amount.

The outer surface of the disk carrier or piston 9 or the inner surface of the guide 19 may be serrated to form a labyrinth type of packing between these two elements. In Figure 4 the serrations are shown provided on the outer surface of the disk carrier and are indicated by the reference character 18. The angle of the serrations to the vertical is such as to secure the maximum possible expansion of the pressure carried in the "exhaust belt" of the guide to be hereinafter described, and depends to a large extent upon the pressure and temperature of the steam or other gas under the valve. For pressures of from 200 to 400 pounds, I have found that an angle of from 2° to 6° to be suitable to give the best possible type of labyrinth packing. By permitting the escape of a small amount of steam to the atmosphere around the periphery of the disk carrier 9, metallic contact between the disk carrier and the guide 19 is reduced to a minimum during the entire time that the disk is away from its seat. After each pop, the disk carrier is perfectly free on the spindle and may be rotated its full tolerance.

The upper peripheral margin of the disk carrier 9 is shown as being flared at 18a at about an angle of 45°. This serves to deflect the steam escaping through the labyrinth packing away from the spring to be hereinafter described, thereby protecting the spring from direct contact with the escaping steam. As will hereinafter be pointed out, a deflector plate may be mounted on the spindle between the disk carrier and the spring to protect the spring as well as the frame rods to be hereinafter described, in which case it will be unnecessary to provide the upper peripheral margin of the disk carrier with the flare 18a.

The numeral 22 designates an annular recess formed in the inner surface of the cylindrical guide 19 near its lower end. This recess will hereinafter be referred to as the "exhaust belt" or "exhaust chamber" for a reason which will appear as the description proceeds. The upper and lower walls of the exhaust belt are preferably disposed at right angles to the vertical circumferential wall. The underside of the lower wall may advantageously be bevelled at an obtuse angle as indicated by the reference numeral 23.

The outer circumferential wall of the exhaust belt is provided with one or more apertures 23a, which may advantageously be disposed radially at equal distances about the exhaust belt. These apertures will hereinafter be referred to as "exhaust ports." Opposite one or more of the exhaust ports is a valve disk 24 disposed at right angles to the corresponding port and carried at the inner end of a threaded rod 25, which extends through the wall of the bowl. In a preferred embodiment, there are four exhaust ports equally spaced about the exhaust belt, two of the exhaust ports being provided with valve disks 24 and the other two exhaust ports being uncontrolled. The valve disks 24 will be hereinafter referred to as "metering valves."

At this point, it is to be noted that the exhaust belt is above the valve seat and that it is normally closed about its inner periphery by the lower periphery of the piston 9. As soon as the valve disk recedes from its seat, the exhaust belt opens into communication with the throat tube, and permits a sufficient amount of steam under pressure to escape from under the valve disk, thus preventing a building up of pressure under the disk. The area of the exhaust belt is large enough to compensate for the jet action and reactive force, but it is not as large as the area of the throat tube. The exhaust belt provides means for eliminating the undesirable effects of jet action and reactive force, thereby rendering it possible to achieve instantaneous full opening without sacrificing minimum blow-down.

It is also to be noted that the metering valves constitute means to regulate or control the amount of steam escaping through the exhaust belt. The metering valves provide for fairly accurate control or regulation of any reaction pressure to which the valve disk may be subjected, and permits a fairly wide range of blow-down. To increase the blow-down, it is merely necessary to screw the threaded rod 25 in toward the exhaust ports, while to decrease the blow-down, the rods are screwed outwardly. I have found it possible to vary the blow-down from above 8% to as low as ½ of 1%.

It is further to be noted that the adjustment of the metering valves is unaffected by the rise and fall of the exhaust belt due to body extension, as the exhaust belt is always within the active field of operation of the nozzle ring 7. Furthermore, no rearrangement or changing of the parts is necessary when the guide 19 is lowered to reseat it after the valve seat is remachined as has already been described. However, it is to be noted that due to the difference in density between saturated and superheated steam, the adjustment of the metering valves cannot be the same for superheated steam as for saturated steam. For this reason, in order to maintain the blow-down for superheated steam when the valve is adjusted for saturated steam, bimetallic controlling strips and clips may be provided as will hereinafter be more particularly described with reference to Figures 9 and 10.

Referring now to the spindle 11, it will be noted that in addition to its reduced lower end 18 it has an upper reduced end 26, which forms a shoulder 27 with the central body portion of the spindle. The end 26 extends through a yoke or cross-bar 28 and is threaded as shown for a purpose to be hereinafter pointed out. The numeral 29 designates a pressure or adjusting screw, which serves as a bushing or guide for the upper end of the spindle in addition to its function of adjusting the pressure on the spring. The crossbar 28 is supported above the valve by means of the two frame rods 30 and 31, which may be threadedly engaged at their lower ends with the lugs 3a. These frame rods serve to overcome in large measure the effect of crawl or body elongation by maintaining the pressure of the spring practically constant.

The numeral 32 designates a sleeve which is mounted on and suspended from the shoulder 27. For most of its length the inner diameter of the sleeve is greater than that of the spindle 11. The sleeve is provided at its lower end with a flange 33, which is spaced a small distance above the top of the disk carrier or piston 9. The numeral 34 indicates a collar or spring washer to which is connected in any suitable manner the coil spring 35, the other end of which spring is supported upon the flange 33 of the sleeve. The spring is shown as being exposed, but it may be enclosed, particularly if the valve is to be used in still work. Pressure is adapted to be applied to the spring through the collar or spring washer 34 by means of the pressure screw 29, which bears directly against the collar or spring washer. The guide rod 36 serves to prevent rotation of the spring washer 34 and the spindle 11 with rotation of the screw 29. Rotation between the spring and the spindle generally occurs in conventional valves when the pressure screw 29 is rotated to set the valve to the required popping pressure and also at the moment the valve pops. Rotation between these elements tends to destroy the lapped seating surfaces and is therefore definitely undersirable.

It is to be noted that the top of the sleeve 32 is the lower limit of movement of the spring washer or collar 34; also that the distance between the lower surface of the washer or collar 34 and the upper margin of the sleeve 32 is equal to the lift that will give full capacity of the nozzle or orifice of the valve. Hence, it is impossible to strain the spring by an overload, for when the spring reaches its capacity or required compression for full lift the washer or collar 34 and the sleeve 32 contact. It is also to be noted that the mounting of the spring also eliminates side thrust and friction between the parts, and that there is a minimum of metallic contact between the spring mounting and the rest of the valve. As will hereinafter be pointed out in greater detail, the spring is protected from direct contact with the steam and from great sudden temperature changes by means of the deflector plate 37 now to be described.

The deflector plate 37 is secured in a suitable manner to the spindle 11 between the valve body 1 of the valve and the sleeve 32. The deflector plate may be rectangular in form and may be provided with the downwardly extending flanges 38 and 39 at the two edges adjacent the frame rods 30 and 31. The deflector plate serves to deflect any steam or vapor that might otherwise reach the frame rods 31 and 32 and the spring 35, thereby protecting said elements from great and sudden temperature changes. Heat cannot reach the frame rods and spring directly. For instance, heat to reach the spring 35 has to pass up the spindle 11 to the point of suspension of the sleeve 32 and then down again to the flange 33 of the sleeve. In this connection, it may be stated that the quantity of heat transmission to the frame rods and the spring can be further decreased by insulating the frame rods from the valve body and insulating the deflector plate from the spindle 11. A suitable manner of insulating the frame rods consists in encasing them in insulation material, it being preferable to maintain complete circulation around the frame rods. It is generally not necessary to extend the insulation material above the deflector plate.

The numeral 40 designates a cap or bonnet of suitable form of construction, which may be secured by means of set screws 41 and 42 to the yoke or cross-bar 28. The bonnet may be provided at its top with a threaded aperture adapted to interchangeably receive a plug 43 or a gag which will be described later.

The numeral 44 refers to a lever which is fulcrumed at 45 in the bonnet. The lever engages the lower surface of a nut 46, which is threadedly connected to the upper reduced end 26 of the spindle 11, and extends through an aperture provided in the side of the bonnet. The lever provides a means for raising the valve disk from its seat by hand or by means of a cable. As will hereinafter be pointed out in greater detail, the lever may also be used to actuate the valve through the medium of a pilot valve.

The embodiment of the invention illustrated in Figure 5 differs from that shown in Figure 2 in two important particulars. In this figure of the drawings, the parts are designated by the same numerals as in Figure 2, a prime being added. It will be noted that the annular rim 12a' on the undersurface of the valve disk 8' is spaced a short distance from the outer edge of the valve body and that the upper circular edge 7" of the nozzle ring 7' extends a short distance above the valve seat and undersurface of the valve disk. The structure shown in Figure 5 is preferred in small valves up to 1½" in order to promote full or maximum lift of the valve disk and the piston.

In Figure 6, I have shown another illustrative embodiment which differs from the embodiments previously described primarily in the construction and manner of inserting the throat tube. Referring to Figure 6 in greater detail, it will be noted that this figure is a section taken at right angles to that of Figure 1. Hence, the frame rods are not shown in this figure. It will also be noted that the bonnet and operating lever have been replaced by a gagging device for testing the valve.

As shown in Figure 6, the body or bowl of the valve, which is denoted by the numeral 51, is provided with the relief opening 52 for connection with a tank adapted to contain fluid under pressure and with the flanged opening 53 to the atmosphere. The relief opening 52 tapers upwardly as shown and communicates with an annular recess 54, within which recess are secured the nozzle throat tube 55 and the nozzle expansion ring 56 in a manner now to be described.

Reference will now be had to Figure 7, which is an enlarged fragmentary vertical cross-section through the upper end of the relief opening 52, the throat tube nozzle 55 and the nozzle expansion ring 56, showing the manner in which these elements are assembled prior to the operation of expanding and rolling the throat tube nozzle and the expansion ring into the recess 54 at the upper end of the relief opening.

As shown in Figure 7, the expansion ring 56 is wider at the bottom than at the top, thus providing an annular step 57. The bottom of the ring may advantageously be provided with a substantially horizontal outer margin 58 and with an inner margin 59 that slopes upwardly as shown. The outer diameters of both the top and bottom portions of the ring 56 are somewhat smaller than the diameter of the recess 54, and the inner diameter of the ring is somewhat smaller than the diameter of the restricted upper portion of the relief opening 52. In assembling the expansion ring 56 with the recess 54, it is merely necessary to drop the expansion ring into the recess so that the horizontal outer margin 58 of the ring rests on the floor of the recess.

The throat tube nozzle 55 is provided with an outer annular vertical flange 60 and an inner vertical flange 61, the two flanges being connected by means of a curved annular recess 62. The outer diameter of the throat tube nozzle 55 is somewhat smaller than the diameter of the recess 54, but it is somewhat larger than the diameters of both portions of the expansion ring 56. The inner diameter of the flange 60 is somewhat smaller than the diameter of the lower portion of the expansion ring, but it is somewhat larger than the diameter of the upper portion of the expansion ring. The inner diameter of the throat tube nozzle (i. e., the inner diameter of the inner flange 61) is somewhat larger than the inner diameter of the expansion ring. The inner flange 61 of the throat tube nozzle is substantially shorter than the outer flange 60, so that when the throat tube nozzle is placed in position (see Figure 7), the outer flange rests on the step 57 of the expansion ring and the flange 61 does not quite reach the upper surface of the expansion ring. The throat tube nozzle and the expansion ring are preferably of the same materials as the body of the valve or of materials having substantially the same coefficient of expansion. As examples of suitable materials may be mentioned stainless steels such as a 4 to 6 chrome steel or a molybdenum steel. The thicknesses of these elements are such that they can readily be expanded and rolled in the manner to be described.

To secure the throat tube nozzle to the body of the valve, the throat tube nozzle 55 and the expansion ring 56 are assembled in reference to the relief opening as shown in Figure 7, and are held by means of a suitable form of clamp to keep them in alinement and to prevent rotation. The throat tube nozzle and the expansion ring are then rolled into the recess 54 by means of a suitable form of expander in a manner similar to that employed in standard boiler tube practice. During this operation, the outer periphery of the throat tube nozzle and the outer periphery of the lower portion of the expansion ring are forced against the vertical wall of the recess 54 and the outer periphery of the upper portion of the expansion ring is forced against the inner periphery of the flange 60, so that the flange 60 is securely clamped between the upper portion of the expansion ring and the vertical wall of the recess 54. The inner peripheries of both the throat tube nozzle and the expansion ring become flush with the upper end of the relief opening 52, the bottom 58, 59 of the expansion ring becomes flush with the floor of the recess 54, and the inner flange 61 of the throat tube nozzle is flattened against the top of the expansion ring. The described rolling in operation is preferably carried out before the other parts of the valve such as the guide, piston, valve disk, etc., are assembled. The construction and manner of assembly just described afford a very inexpensive and effective way to insure tightness between the throat tube and the valve body and to eliminate leakage between the seat ring and body wall due to variable expansion and construction. The above described construction also serves to greatly reduce the differential expansion between the valve body and throat tube.

Before leaving the throat tube construction, it may be stated that the effectiveness of the clamping action of the expansion ring may be substantially increased by providing the vertical wall of the recess 54 and the outer periphery of the upper portion of the expansion ring with one or more horizontal annular grooves. In Fig. 7, it will be noted that I have provided the vertical wall of the recess 54 with an annular groove 63 and the outer periphery of the upper portion of the expansion ring 56 with an annular groove 64. The annular groove 64 is somewhat lower in position than the groove 63, and it will be understood that during the expanding and rolling in operation a portion of the smooth outer surface of the flange 60 is forced into the groove 63 and a portion of the smooth inner surface of the flange 60 is forced into the groove 64.

Cooperating annular ribs and grooves may also be provided between the lower portion of the expansion ring 56 and the recess 54 and between the upper portion of the expansion ring and the flange 60 of the throat tube nozzle. In Figure 7, it will be noted that I have provided the lower portion of the expansion ring with a horizontal annular rib 65 and that I have provided the vertical wall of the recess 54 with a cooperating annular groove 66. Also that I have provided the inner surface of the flange 60 and the upper portion of the expansion ring 56 with cooperating annular groove 67 and rib 68. Each cooperating annular groove and rib are preferably of the same vertical dimension (width), but the ribs are preferably of a greater horizontal dimension than the cooperating grooves. It will be understood that during the expanding and rolling in operation, the ribs 65 and 68 will be forced into the corresponding grooves 66 and 67 and that because of the relative dimensions of the ribs and grooves, the ribs will be caused to flatten out or become "bull-nosed."

Referring again to Figure 6, it will be noted that the body of the valve, which is designated by the numeral 51, is provided with a flat annular seat 70 upon which are mounted the guide 71 and the adjusting ring 72 for the guide. The annular seat 70 is provided with a plurality of spaced threaded apertures for receiving the studs 73, which are threaded at their bottom portions as indicated.

The guide is provided as shown with an annular flange 74, which is provided with a plurality of apertures equal in number to those in the annular seat 70. The flange 74 may advantageously be provided with the dependent annular rib 74a, which is shown as bearing against the vertical wall of the valve body and forming an annular recess. Because of this construction, the binding tendency between the guide and the valve body is largely overcome, and the guide may be readily removed from the valve body even at high temperatures. The outer periphery of the flange is threaded as indicated by the numeral 75 to receive the adjusting ring 72.

As shown in Figure 8, the adjusting ring 72 is in the form of a split annulus provided with a vertical slot 76. The split ring is provided on each side of the slot with an ear 77, the two ears being provided with alined apertures 78 and 79 for receiving a bolt 80. The numeral 81 denotes a suitable form of lock nut for the bolt. The ring 72 is provided on its inner periphery with screw threads 82 to cooperate with the threads on the outer periphery of the flange 74 of the guide. The ring may be provided on its outer periphery with a plurality of equally spaced vertical lugs 83 which serve a purpose to be hereinafter pointed out.

To assemble the guide 70 and the adjusting ring 72 for the guide, the ring 72 is screwed on the flange of the guide so as to project a small amount below the flange and the bolt 80 is locked finger tight. To assemble the foregoing parts with the valve body, the studs 73 are driven home in the valve body. Then the guide 70 is dropped into the body of the valve over the studs 73 so that the studs pass through the apertures in the flange 74. The adjusting ring is then adjusted the desired amount and locked by means of the nut 81. This adjustment may be made by rotating the adjusting ring a distance equal to one or more lugs 83, until the floor of the exhaust belt is a predetermined amount above the valve seat. Finally the nuts 84 and 85 are tightened on the studs 73. The adjustment by means of the adjusting ring renders it possible to use the same valve for a much greater range of pressures and capacities, without changing the diameter of the valve seat or the diameter of the guide, than had previously been considered possible.

The other parts of the valve of Figure 6 are substantially similar to the corresponding parts of the valve of Figures 1 to 6 and for that reason need not be described in detail. Briefly stated, the piston or disk carrier is denoted by the numeral 86, the spindle is 87, the deflecting plate is 88, the valve disk is 89, the exhaust belt is 90, the exhaust ports are 91, the metering valves are 92, the spring is 93, the sleeve for the spring is 94, the cross-bar is 95, the pressure or adjusting screw is 96, the nozzle ring is 97 and the locking screw for the nozzle ring is 98. As previously noted, the bonnet and operating lever have been removed in Figure 6 and replaced with a novel form of gag. The gag will be hereinafter described. It is to be noted that the cooperating surfaces of the guide 71 and the piston 86 may be provided with the labyrinth type of packing illustrated in Figure 4.

Any of the various embodiments of the valve that have been described may be installed in any position, but they are preferably installed either vertically above the steam line or with the spring and frame rods hanging vertically below the line. If the valve is to be installed vertically downwards, it is preferable to provide a housing for the spring. As previously stated, the frame rods may also be encased in insulation material, provided that complete circulation around the frame rods is maintained.

It is thought that the mode of operation of the valve will be understood from the foregoing description. Suffice it to say, that as the pressure of the steam in the throat tube reaches the popping pressure, the valve disk rises instantaneously to its full lift in a single stage. As has been previously stated, the least amount of steam at popping pressure leaking from the throat tube into the annular groove between the valve seat and the nozzle ring (space 7b in Figure 2) is sufficient to cause the valve to pop. As the valve disk recedes from its seat, steam is compressed into the exhaust belt from which it escapes through the exhaust ports to an extent depending upon the adjustment of the closure disks of the metering valves, thus removing the excess pressure from beneath the valve disk and eliminating all impediment to the closing of the valve when the necessary relief is obtained. As the valve disk returns to its seat the steam in the annular groove between the valve seat and the nozzle ring is compressed, forming a cushion so that the valve disk seats without shock or injury to the meeting surfaces. As previously noted, the metering valves may be readily adjusted to give a predetermined blow-down for a given set of conditions.

As has been stated, due to the difference in density between saturated and superheated steam, the adjustment of the metering valves cannot be the same for superheated steam as for saturated steam. In order to maintain the blow-down for superheated steam when the metering valves are adjusted for saturated steam, bimetallic strips and clips may be provided in association with the exhaust ports.

The bimetallic strip used in association with one of the exhaust ports is illustrated in Figure 9 and the bimetallic clip used in association with one of the metering valves is illustrated in Figure 10.

Referring to Figure 9, which is a fragmentary horizontal cross-section through the exhaust belt of a modified form of valve, the numeral 100 denotes the guide, within the lower end of which the exhaust belt is formed, and the numeral 101 denotes one of the exhaust ports in the exhaust belt. This is one of the exhaust ports that is not provided with a metering valve. The numeral 102 designates a support in the form of an arc which is permanently secured by rivets 103 to the wall of the exhaust belt. The numeral 104 denotes the bimetallic strip, which is also in the form of an arc having the two bent back end portions 105 and 106. The bimetallic strip is secured to the support 102 by the two rivets 103 in parallel spaced relation to the wall of the exhaust chamber with the two bent back end portions 105 and 106 in contact with the wall as shown. One or more apertures may be provided near the end portions of the support 102 to enable the steam to come into contact with the bimetallic strip and to pass freely through the exhaust port when the bimetallic strip is in the inactive position shown in solid lines.

The two metals of which the strip 104 is made are so chosen that the strip will expand and move outwardly against the exhaust port 101 as shown in dotted lines, when the temperature reaches a predetermined amount, and the strip will return to its normal position (shown in solid lines) when the temperature drops again to a predetermined lower limit. The upper and lower limits depend upon the conditions under which the valve is to be used. For instance, if the valve is to be used with steam at a pressure of 600 pounds per square inch, the upper limit should be about 200° higher than 486° F., which is the temperature of saturated steam at 600 pounds pressure. An upper limit of about 700° F. has been found to be particularly suitable. The lower limit may be between 486° and 700° F., a suitable lower limit being about 500° F. The range between 486° F. and 700° F. will adequately take care of steam at 600 pounds pressure having from about 200° to 400° superheat.

It will be understood from the foregoing description of the bimetallic strips that at 600 pounds pressure, the exhaust ports will remain open as long as the temperature of the steam in the exhaust belt is below 700° F. Hence, as long as saturated steam or steam having less than 214° superheat is in the exhaust belt, the exhaust ports will remain open, thereby permitting sufficient steam to escape to keep the blow-down at the value for which the valve was set or designed. If the ports were not provided with the bimetallic strips the ports would also remain open in case steam of a high superheat were to pass into the exhaust belt. Since superheated steam is less dense than saturated steam, the blow-down would tend to decrease below that for which the valve was set or designed. The closing of the ports by the bimetallic strips serves to retain the steam in the exhaust chamber and hence overcomes the tendency for the blow-down to decrease, thereby maintaining the blow-down at the predetermined value.

Referring to Figure 10, which is a fragmentary vertical cross-section through the exhaust belt of a modified form of valve, the numeral 110 denotes the body of the valve, the numeral 111 is one of the exhaust ports in the exhaust belt and the numeral 112 is the metering valve. The metering valve consists of a valve disk 113 carried on the inner end of a threaded rod 114, which extends through the wall of the valve body 110. Secured to the valve disk in a suitable manner is a bimetallic strip or clip 115, which is normally inclined so as to permit the escape of steam from the exhaust port 111. The bimetallic strip or clip has a free lower end 116, which under the influence of steam of a predetermined temperature is adapted to move inwardly against the exhaust port 111, thereby sealing it against the escape of steam. The bimetallic strip or clip 115 may be utilized in the same valve in which the bimetallic strip 104 is used, in which case the two elements of which the clip or strip 115 is formed would preferably have the same characteristics as the bimetallic strip 104. In an illustrative form of valve, the exhaust belt is provided with four equally spaced exhaust ports, two opposite exhaust ports being provided with metering valves. The exhaust ports that are not provided with metering valves are provided with the internally arranged bimetallic strips 104, and the valve disk of each metering valve is provided with a bimetallic strip or clips 115. If found necessary or desirable, the bimetallic strips may be omitted from all but one of the exhaust ports or metering valves.

Each of the various forms of valve that has been described is suitable for use either as a pilot valve or as a pilot-actuated valve in a fluid pressure system. If the valve is to be used as a pilot-actuated valve, it should not be provided with the bimetallic strips and clips above described.

In Figure 11 is illustrated a pilot valve made in accordance with the invention. With the exception of a few details, the pilot valve is similar in construction to the form of valve shown in Figure 6. Briefly stated, the valve body is designated by 120, the relief opening is denoted by 121, the throat tube and associated parts are indicated by 122, the flanged opening to the atmosphere by 123, the frame rods by 124 and 125, the guide by 126, the adjusting ring for the guide by 127, the locking nut for the adjusting ring by 128, the studs by 129, the nuts for the studs by 130 and 131, the piston by 132, the spindle by 133, the spring by 134, the sleeve for the spring by 135, the pressure or adjusting screw by 136, the cross-rod by 137, the bonnet by 138, the operating lever by 139, the deflector plate by 140 and the valve disk by 141. The reference numeral 142 indicates an adjustable indicator that may be used to indicate the lift of the valve. The numeral 143 designates the exhaust chamber, 144 and 145 denote two of the exhaust ports, and 146 denotes a metering valve for one of the ports 144. The other port instead of being provided with a metering valve is in alinement with a tube 147 which may be formed integrally with the body of the valve. The port 145 may be one of the two ports that are not normally provided with metering valves, in which case the tube 147 would be at right angles to metering valve 146 instead of being opposite thereto as shown. The tube 147 may advantageously be provided with a flange 148 so that the tube 147 may be readily connected with a second tube 149 leading to the operating lever of a pilot-actuated valve. For this purpose, the second tube 149 may also be provided with a flange 150. Instead of the illustrated flanged connections, screwed connections may be used, if so desired, as the pressure developed in the actuating line is rather low.

Any of the embodiments of the invention that have been described as well as any conventional form of safety valve may be modified in construction so as to be actuated by the jet of steam issuing from the exhaust port of the pilot valve of Figure 11. It is merely necessary to provide the valve to be actuated by the pilot valve with means actuated by the jet of steam to raise the operating lever and hence the valve disk independently of the pressure below the valve disk.

In Figure 12 is illustrated a form of valve similar to the valve of Figure 6 modified in construction to adapt it for use as a pilot-actuated valve. The valve body is indicated by 151, the relief opening by 152, the flanged opening to the atmosphere by 153, the throat tube assembly by 154, the guide by 155, the adjusting ring for the guide by 156, the deflector plate by 157, the valve disk by 158, the piston by 159, the spindle by 160, the spring by 161, the sleeve for the spring by 162, the spring washer by 163, the pressure or adjusting screw by 164, the nozzle ring for the throat tube by 165, the locking screw for the nozzle ring by 166, the exhaust belt by 167, the exhaust ports by 168 and the metering valves by 169. All of the foregoing elements are substantially of the same construction as the corresponding elements shown in Figure 6.

In Figure 12, the numeral 170 denotes a modified form of cross-bar or yoke provided with an extension 171 for supporting the cylinder 172. The cylinder has a reduced upper portion 173 which fits snugly in an aperture provided in the extension, a part of 173 extending above the aperture and being provided with screw threads to receive a nut 174 to secure the cylinder in position. The numeral 175 denotes a lock nut of suitable construction provided with a key in the form of a cotter pin 176.

Mounted for vertical slidable movement within the cylinder 172 is a piston 177 provided with a vertical pin 178, which projects above the lock nut 175 and is normally in contact with the undersurface of the operating lever 179. The lever may be provided with a cam surface 180 as shown to coact with the pin 178. The lever is fulcrumed at 181 in the bonnet 182 of the valve and contacts the lower surface of a nut 183, which is threadedly connected to the upper reduced end of the spindle 160. The nut 183 may be locked in position by means of a suitable form of lock nut 184.

The piston 177 may advantageously be of the construction illustrated in Figure 12. As there shown, the piston has a wide lower portion 185 fitting snugly in the central portion of the cylinder, and a narrow upper portion 186 fitting snugly in the reduced upper portion of the cylinder. The lower portion of the piston may be hollowed out as at 187 to reduce the weight of the piston and may also be provided about its outer periphery with a number of annular grooves 188 and 189 and with a number of serrations 190. The narrow upper portion of the piston may be provided with a series of peripheral serrations 191 and with a number of vertical slots 192. The purpose of the annular grooves and serrations in the piston is to form a labyrinth packing as in the case of the guide and piston of the valves. The slots 192 permit air and steam to escape from the cylinder when the piston rises to prevent the pressure within the cylinder from building up.

The bottom of the cylinder 172 is closed by means of a plate 193. Between the piston 177 and the bottom plate 193 is provided a vertical cylindrical screen 194 for a purpose which will appear as the description proceeds. As shown, the bottom of the cylinder is provided at one side with an opening 195 for connection to the actuating line 149 from the pilot valve. Steam entering the cylinder 172 through the aperture 195 must pass through the screen, and hence any dirt that may be in the steam is kept out of the cylinder.

It is to be noted that the above described construction renders it possible to rotate the crossbar or yoke 170 with the frame rods (not shown) as much as 180° to meet piping requirements.

It will be understood from the foregoing description that when the pilot valve pops, there will issue from the exhaust port 145 a jet of high velocity steam which will flow through the tubes 147 and 149 to the cylinder 172 of the pilot-actuated valve, and that this jet of steam will raise the piston 177 and the pin 178 against the cam surface 180 on the undersurface of the lever 179, thereby raising the valve disk 158 independently of the pressure under the valve disk. When the pilot valve closes, the flow of steam from the exhaust chamber ceases. The piston 177 then drops and the valve disk 158 is caused to return to its seat. It is to be noted that the valve disk 158 cannot seat itself before the pilot valve closes, due to the fact that the steam in the actuating line tends to expand. It is also to be noted that in case the pilot valve for some reason fails to function, the pilot-actuated valve will nevertheless operate to relieve excess pressure that may be built up under the valve disk 158.

As has been stated, the valves of Figures 6 and 12 are shown provided with a novel form of gag to be used when testing the valves. Referring to Figure 13 of the drawings, it will be noted that the gag, which is indicated generally by the numeral 200, has a body portion in the form of a threaded rod 201 which terminates in a pointed lower end 202. The rod 201 is shown provided at its upper portion with a flat fingerhold 203.

The gag of the present invention is adapted to be used either with the conventional form of valve bonnet as shown in Figure 12 or with a special form of bonnet as shown in Figure 6. To adapt the conventional form of bonnet for use with the gag of the invention, it is merely necessary to provide a threaded aperture 204 in the top of the bonnet in alinement with the valve stem or spindle. This aperture can very easily be made while the bonnet is being machined. When the gag is not being used, the aperture may be closed by means of a suitable form of plug. (See numeral 43 in Figure 1).

The special form of bonnet is indicated in Figure 6 by the numeral 205. As illustrated the bonnet is adapted to be substituted for the conventional bonnet and lever of the valve, and is provided at its top with a threaded aperture 206 in direct alinement with the valve stem or spindle. The bonnet 205 may be secured to the cross-bar 95 by means of the screws 207 and 208.

To use the gag of the invention, it is merely necessary to insert the threaded body portion 201 through the threaded aperture in the top of the bonnet and to turn the gag by means of the fingerhold 203 to bring the pointed lower end 202 into a suitably formed aperture in the upper end of the spindle. No wrenches are required, it being merely necessary to tighten the gag by means of the fingers.

It will be understood from the foregoing description that the gag of the invention is very simple and inexpensive in construction, and that it affords a very effective way of gagging a valve for test purposes. The load is carried centrally of the valve stem or spindle and is so distributed that the lower pointed end 202 serves merely to guide the gag into the recess in the top of the stem or spindle. There is no tendency to bend the stem or spindle as when the cumbersome gag of the prior art is used.

In Figure 14, I have illustrated a suitable form of fluid system embodying several valves made in accordance with the teachings of the present invention. Referring to said figure of the drawings, the numeral 250 indicates the drum of a steam generating boiler, 251 are the coils of a superheater, 252 is a suitable connection between the drum 250 and the superheater coils, 253 is the superheater outlet line, and 254 is a suitable connection between the superheater 251 and the superheater outlet line 253.

The letter A designates a pilot valve on the drum, B is a pilot-actuated valve on the superheater outlet line, C is a second drum valve which, however, is not a pilot valve, and D is a second superheater outlet valve, which may or may not be a pilot-actuated valve.

The valve A may be of the construction shown in Figure 11, and the valve B may be of the construction illustrated in Figure 12. Valves C and D may be of the constructions shown in Figures 1 to 6 inclusive. Neither valves A, B nor C are provided with bimetallic strips or clips. Valve D may be provided with the bimetallic elements, unless it is pilot-actuated.

The numeral 255 designates the actuating line from the exhaust belt of the pilot valve A to the cylinder 256 of the pilot-actuated valve B. This cylinder contains a piston (not shown) provided with a pin 257 which is in contact with the underside of the operating lever 258. In case valve D is also to be pilot actuated, it should also be provided with a cylinder and piston as well as with a connection to actuating line 255.

The numeral E denotes a gate valve connected to the drum 250 by means of a line 259 and to the actuating line 255 of the pilot-actuated valve B by means of the line 260. The gate valve may be provided with suitable mechanical or electrical operating means and may be located in any convenient position, as for instance in the boiler room convenient to the chief engineer.

In the illustrative embodiment of the system shown in Figure 14, the pilot valve A may have a capacity of 8,000 pounds of steam per hour, a popping pressure of 610 pounds and a blow-down of 18 pounds; the pilot-actuated valve B may have a capacity of 45,000 pounds of steam per hour, a popping pressure of about 610 pounds and a blow-down of 18 pounds; valve C may have a capacity of 55,000 pounds of steam per hour, a popping pressure of 616 pounds and a blow-down of 18 pounds; and valve D may have a capacity of 38,000 pounds of steam per hour, a popping pressure of 618 pounds and a blow-down of 18 pounds.

It is thought that the operation of the system will be readily understood from the foregoing description. Suffice it to say, that if the system is operating normally and a heavy draft of steam is being taken from the outlet line, the pressure in the system will remain below the popping pressure and all of the valves will remain shut. Should, however, the call for steam cease, there will be a rapid build-up of pressure in both the superheater and in the saturated drum. Due to the normal drop in pressure between the drum and the superheater, the pilot valve A will normally pop first (i.e., as soon as the pressure under the valve disk in pilot valve A reaches 610 pounds). A small jet of steam from the exhaust belt of valve A will then be carried by the actuating line 255 to the cylinder 256 of pilot-actuated valve B, and the lever 258 thereof will be raised by the piston and valve B will also pop. If the popping of valves A and B does not relieve the pressure in the line sufficiently, then valve C will pop, and if the pressure is still not reduced sufficiently, valve D will also go. As soon as the pressure below the valve disk of the pilot valve drops by an amount equal to the blow-down, valve A will return to its seat, and valve B will follow. It is to be noted that valve B cannot seat before valve A due to the expansion of steam in the actuating line. In the illustrative system the lag between the closing of valves A and B is about 2/5 of a second. Valves C and D will close about the same time as valve B.

In case valve A for any reason fails to pop, valve B will nevertheless pop as soon as the popping pressure is reached below its valve disk. In case of an emergency, the chief engineer can readily open the gate valve E, thereby causing valve B to pop irrespective of the line pressure, and preventing the burning out of the superheater coils.

The gate valve E may, if desired, be connected to any one or more of the other valves in the system, so that the chief engineer may blow the connected valves at any time he considers such action necessary. It will be understood that each safety valve to be connected to the gate valve should be provided with a cylinder and a piston as in the case of valve B.

From the foregoing description it will be seen that I have provided a valve of relatively simple construction, particularly adapted for service as a safety valve for pressure as high as 3000 pounds per square inch and temperatures as high as 1000° F., which may be readily adapted for use either as a pilot or pilot-actuated valve, which operates smoothly, sharply and without dirling, flutter, simmering (warn), chatter or seat drumming, which rises instantaneously to its full lift without any accumulation of pressure (overpressure), which closes abruptly at a relatively small drop in pressure below that at which the valve is set to pop, which always pops at substantially the same pressure, which is provided with means to regulate the blow-down, and with means to maintain the blow-down at the same value for both saturated and superheated steam, in which distortion of the valve disk and the valve seat is practically eliminated, in which the tearing action between the valve seat and the disk is reduced to a minimum, in which leakage between the seat ring and the body wall resulting from variable expansion and contraction is practically eliminated, in which the loading spring is protected from the fluid and from sudden and great changes of temperature as well as from the danger of overloading, in which undue stresses in the body or base of the valve are eliminated as well as the compressive strain on the throat tube, in which the throat tube and the valve body are protected from entrapped moisture and in which the collection of foreign materials tending to set up local centers for electrolytic action is eliminated.

In conclusion, it may be stated that various other modifications of the invention may be made, and that it is therefore to be understood that the invention is not to be considered as being limited by the specific examples herein given as illustrative of the invention, except as may be necessitated by the state of the prior art.

This application is a continuation in part of application Serial No. 31,011, filed July 12, 1935.

I claim:

1. A safety valve of the type described, comprising a valve body provided with a relief opening for connection with a tank adapted to contain fluid under pressure, said opening being provided about its periphery with an annular valve seat, a piston slidably mounted within said valve body in alinement with said relief opening and extending to the atmosphere, a valve disk carried by said piston in position normally to be seated against said valve seat, the body of said valve adjacent said relief opening being provided with an annular recess and with one or more apertures communicating with said recess, said piston being adapted to uncover said recess, said piston being provided with a serrated outer surface to form a labyrinth type of packing between said piston and the body of said valve, and adjustable means for controlling said apertures.

2. A safety valve of the type described, comprising a valve body provided with a relief opening for connection with a tank adapted to contain fluid under pressure, said opening being provided about its periphery with an annular valve seat, a cylindrical guide open to the atmosphere and extending into said body in substantial alinement with said relief opening, a cylindrical piston slidably mounted within said guide, a valve disk carried by said piston in position normally to be seated on said valve seat, said guide being provided near its lower end with an annular recess constituting an exhaust chamber and with one or more apertures in constant communication with said recess, said recess being adapted to be covered and uncovered by said piston in its slidable movement, and means for controlling said apertures.

3. In a safety valve, a valve body open at its top and provided with a flat annular seat, a cylindrical guide provided with an annular flange, said guide extending into said valve body and being suspended by its flange from said annular seat, a cup-shaped piston having a length substantially equal to that of the guide slidably mounted within said guide, said piston being provided with a recess in its bottom, a spindle extending through said piston into said recess, a valve disk mounted within said recess and carried by the lower end of said spindle, a spring washer mounted on said spindle above said valve body, a flanged sleeve freely suspended from said spindle below said spring washer, a loading spring coiled about said sleeve and confined between said washer and the flange of said sleeve, a throat tube in said valve body provided at its upper periphery with a valve seat, said valve disk being adapted to be seated normally on said valve seat.

4. A safety valve of the type described, comprising a valve body, a throat tube in said valve body provided at its upper periphery with a valve seat, a guide mounted in said valve body above said valve seat in fixed relation thereto, said guide being provided near one end with an annular recess forming an exhaust chamber and with one or more apertures in constant communication with said exhaust chamber, adjustable means to control said apertures, a piston slidably mounted within said guide and adapted to uncover said exhaust chamber, and a valve disk carried by said piston in position normally to be seated on said valve seat.

5. In a safety valve, a valve body open at its top and provided with a flat annular seat, a guide provided with an annular flange, said guide extending into said valve body and being suspended by its flange from said annular seat, said guide being provided near one end with an annular recess forming an exhaust chamber and with one or more apertures communicating with said exhaust chamber, adjustable means to control said apertures, a piston slidably mounted within said guide and adapted to uncover said exhaust chamber, a throat tube in said valve body below said piston, said throat tube being provided about its upper periphery with a valve seat, and a valve disk carried by said piston in position normally to be seated on said valve seat.

6. As a subcombination of a safety valve, a cylindrical guide, said guide being provided near one end with an annular recess forming an exhaust chamber and with one or more apertures constituting exhaust ports communicating with said recess or exhaust chamber, bimetallic strips associated with said exhaust ports for automatically closing said exhaust ports at a predetermined temperature, a cylindrical valve disk carrier mounted for slidable movement within said cylindrical guide and being movable to uncover said recess or exhaust chamber, and a valve disk carried by said carrier.

7. As a subcombination of a safety valve, a cylindrical guide, said guide being provided near one end with an annular recess forming an exhaust chamber and with one or more apertures constituting exhaust ports communicating with said recess or exhaust chamber, adjustable means for controlling said exhaust ports, bimetallic strips associated with said exhaust ports for automatically closing said exhaust ports at a predetermined temperature, a cylindrical valve disk carrier mounted for slidable movement within said cylindrical guide and being movable to uncover said recess or exhaust chamber, and a valve disk carried by said carrier.

8. A safety valve of the type described, comprising a valve body provided with a relief opening for connection with a tank adapted to contain fluid under pressure, said opening being provided about its periphery with an annular valve seat, a piston slidably mounted within said valve body in alinement with said relief opening, a valve disk carried by said piston in position normally to be seated against said valve seat, the body of said valve adjacent said relief opening being provided with an annular recess forming an exhaust chamber and with one or more apertures constituting exhaust ports communicating with said recess or exhaust chamber, bimetallic strips associated with said exhaust ports to automatically close said exhaust ports at a predetermined temperature, said piston being adapted to cover and uncover said recess or exhaust chamber in its slidable movement.

9. A safety valve of the type described, comprising a valve body provided with a relief opening for connection with a tank adapted to contain fluid under pressure, said opening being provided about its periphery with an annular valve seat, a piston slidably mounted within said valve body in alinement with said relief opening, a valve disk carried by said piston in position normally to be seated against said valve seat, the body of said valve adjacent said relief opening being provided with an annular recess forming an exhaust chamber and with one or more apertures constituting exhaust ports communicating with said recess or exhaust chamber, adjustable means for controlling said exhaust ports, bimetallic strips associated with said exhaust ports to automatically close said exhaust ports at a predetermined temperature, said piston being adapted to cover and uncover said recess or exhaust chamber in its slidable movement.

10. A safety valve of the type described, comprising a valve body provided with a relief opening for connection with a tank adapted to contain fluid under pressure, said opening being provided about its periphery with an annular valve seat, a cylindrical guide disposed within said body in substantial alinement with said relief opening, a cylindrical piston slidably mounted within said guide, and a valve disk carried by said piston in position normally to be seated on said valve seat, said guide being provided near its lower end with an annular recess constituting an exhaust chamber, said recess being adapted to be covered and uncovered by said piston in its slidable movement, and the outer circumferential wall of said recess being provided with a plurality of exhaust ports, said recess and said exhaust ports being in constant communication.

11. A safety valve of the type described, comprising a valve body provided with a relief opening for connection with a tank adapted to contain fluid under pressure, said opening being provided about its periphery with an annular valve seat, a cylindrical guide disposed within said body in substantial alinement with said relief opening, a cylindrical piston slidably mounted within said guide, a valve disk carried by said piston in position normally to be seated on said valve seat, said guide being provided near its lower end with an annular recess constituting an exhaust chamber, said recess being adapted to be covered and uncovered by said piston in its slidable movement, and the outer circumferential wall of said recess being provided with a plurality of exhaust ports, and means for closing said exhaust ports at a predetermined temperature.

12. As a subcombination of a safety valve, a valve body open at its top and provided with a flat annular seat, a cylindrical guide provided with an annular flange, an adjusting ring clamping the flange of said cylindrical guide and being supported by said annular seat, said cylindrical guide extending into said valve body and being suspended by its flange from the adjusting ring, a piston slidably mounted within said guide, and a valve disk carried by said piston.

13. As a subcombination of a safety valve, a cylindrical guide, said guide being provided on its inner periphery near one end with an annular recess forming an exhaust chamber, said guide being provided on its outer periphery with one or more apertures in constant communication with said annular recess, adjustable means for controlling said apertures, a cylindrical piston mounted within said cylindrical guide, the outer periphery of said piston normally covering said annular recess, and said piston being adapted to be moved to uncover said annular recess, and a valve disk carried by said piston.

14. A safety valve of the type described, comprising a valve body provided with a relief opening for connection with a tank adapted to contain fluid under pressure, said opening being provided about its periphery with an annular valve seat, a tubular guide in substantial alinement with the relief opening, said guide being provided on its inner periphery at the end adjacent said relief opening with an annular recess forming an exhaust chamber, said guide being provided on its outer periphery with one or more apertures in constant communication with said annular recess, a piston mounted within said guide, the outer periphery of said piston normally covering said annular recess, and said piston being adapted to be moved to uncover said annular recess, and a valve disk carried by said piston and being normally seated against said valve seat, and when thus seated being disposed between said relief opening and said annular recess.

15. A safety valve of the type described, comprising a valve body provided with a relief opening for connection with a tank adapted to contain fluid under pressure, said opening being provided about its periphery with an annular valve seat, a tubular guide in substantial alinement with the relief opening, said guide being provided on its inner periphery at the end adjacent said relief opening with an annular recess forming an exhaust chamber, said annular recess being provided with one or more apertures communicating with the outer periphery of said guide, a piston mounted within said guide, and extending to the atmosphere, the outer periphery of said piston normally covering said annular recess, and said piston being adapted to be moved to uncover said annular recess, and a valve disk carried by said piston and being normally seated against said valve seat, and when thus seated being disposed between said relief opening and said annular recess.

16. A safety valve of the type described, comprising a valve body provided with a relief opening for connection with a tank adapted to contain fluid under pressure, said opening being provided about its periphery with an annular valve seat, a tubular guide in substantial alinement with the relief opening, said guide being provided on its inner periphery at the end adjacent said relief opening with an annular recess forming an exhaust chamber, said annular recess being provided with one or more apertures communicating with the outer periphery of said guide, a piston mounted within said guide, said piston being provided with a serrated outer surface, the outer periphery of said piston normally covering said annular recess, and said piston being adapted to be moved to uncover said annular recess, and a valve disk carried by said piston and being normally seated against said valve seat, and when thus seated being disposed between said relief opening and said annular recess.

17. The safety valve defined in claim 14, one or more of the apertures in said annular recess being provided with metering valves to control the amount of steam escaping from said annular recess.

PERRY H. GENTZEL.